(12) United States Patent
Kaiser et al.

(10) Patent No.: US 10,044,014 B2
(45) Date of Patent: Aug. 7, 2018

(54) BATTERY UNIT COMPRISING A PLURALITY OF ELECTROCHEMICAL CELLS AND BATTERY MODULE COMPRISING A PLURALITY OF BATTERY UNITS

(71) Applicant: Robert Bosch GmbH, Stuttgart (DE)

(72) Inventors: Rudi Kaiser, Bamberg (DE); Holger Reinshagen, Bamberg (DE); Silvan Poller, Neisseaue Ot Kaltwasser (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 15/311,502

(22) PCT Filed: Apr. 27, 2015

(86) PCT No.: PCT/EP2015/059029
§ 371 (c)(1),
(2) Date: Nov. 15, 2016

(87) PCT Pub. No.: WO2015/172997
PCT Pub. Date: Nov. 19, 2015

(65) Prior Publication Data
US 2017/0084893 A1    Mar. 23, 2017

(30) Foreign Application Priority Data
May 16, 2014    (DE) .................. 10 2014 209 286

(51) Int. Cl.
*H01M 2/10*    (2006.01)
*H01M 2/02*    (2006.01)
(Continued)

(52) U.S. Cl.
CPC ......... *H01M 2/1094* (2013.01); *H01M 2/028* (2013.01); *H01M 2/0275* (2013.01);
(Continued)

(58) Field of Classification Search
CPC ............. H01M 2/1094; H01M 2/1235; H01M 2/0275; H01M 10/659; H01M 10/613
See application file for complete search history.

(56) References Cited

U.S. PATENT DOCUMENTS

2012/0015226 A1*  1/2012  Kim ................... H01M 2/0262
                                                         429/94
2012/0121963 A1*  5/2012  Kwon ................ H01M 2/0275
                                                         429/127
(Continued)

FOREIGN PATENT DOCUMENTS

DE    102008001286 A1    10/2009
DE    102010033794 A1    2/2012
(Continued)

OTHER PUBLICATIONS

International Search Report for Application No. PCT/EP2015/059029 dated Nov. 9, 2015 (English Translation, 2 pages).

*Primary Examiner* — Stewart A Fraser
(74) *Attorney, Agent, or Firm* — Michael Best & Friedrich LLP

(57) ABSTRACT

The invention relates to a battery unit (1) comprising: a plurality of electrically interconnected electrochemical cells (2), each of said cells having an electrode arrangement (3), in particular a lithium-based electrode arrangement (3) with a cathode contact element (4) and an anode contact element (5); and an outer sheathing (7) surrounding a chamber (6) in which the electrochemical cells (2) are arranged. The outer sheathing (7) is designed as a humidity barrier and as a chemical barrier. Each individual electrochemical cell (2) of the battery unit (1) comprises an electrically insulating sheathing (8) which surrounds the respective electrode arrangement (3). The invention also relates to a battery
(Continued)

module comprising a plurality of electrically interconnected battery units (1) designed according to the invention.

17 Claims, 1 Drawing Sheet

(51) Int. Cl.
*H01M 2/20* (2006.01)
*H01M 10/6557* (2014.01)
*H01M 10/613* (2014.01)
*H01M 10/659* (2014.01)
*H01M 2/12* (2006.01)
*H01M 10/052* (2010.01)

(52) U.S. Cl.
CPC ....... *H01M 2/1077* (2013.01); *H01M 2/1235* (2013.01); *H01M 2/206* (2013.01); *H01M 10/613* (2015.04); *H01M 10/659* (2015.04); *H01M 10/6557* (2015.04); *H01M 10/052* (2013.01); *H01M 2200/20* (2013.01)

(56) References Cited

U.S. PATENT DOCUMENTS

| | | | |
|---|---|---|---|
| 2013/0202939 A1 | 8/2013 | Kwak et al. | |
| 2013/0280591 A1* | 10/2013 | Kim | H01M 2/0207 |
| | | | 429/160 |
| 2013/0330615 A1* | 12/2013 | Morita | H01M 4/131 |
| | | | 429/211 |
| 2014/0220391 A1* | 8/2014 | Fujii | H01M 10/4257 |
| | | | 429/7 |

FOREIGN PATENT DOCUMENTS

| | | |
|---|---|---|
| DE | 102011088636 | 6/2013 |
| DE | 102012205810 | 10/2013 |
| DE | 102012009385 A1 | 11/2013 |
| EP | 2317587 A2 | 5/2011 |
| JP | 2013161772 | 8/2013 |

* cited by examiner

BATTERY UNIT COMPRISING A PLURALITY OF ELECTROCHEMICAL CELLS AND BATTERY MODULE COMPRISING A PLURALITY OF BATTERY UNITS

BACKGROUND OF THE INVENTION

The invention relates to a battery unit comprising a plurality of electrically interconnected electrochemical cells that comprise in each case an electrode assembly having a cathode contact element and an anode contact element, and an outer sheath that encompasses an arrangement chamber in which the electrochemical cells are arranged.

Furthermore, the invention relates to a battery module having a plurality of electrically interconnected battery units.

Battery cells having a plurality of electrically interconnected electrochemical cells are known in different embodiments in the prior art. Furthermore, battery modules are known that comprise a plurality of interconnected battery cells as electrochemical cells. It is preferred that lithium ion cells are used as battery cells in particular owing to the high energy density.

Lithium ion cells can be embodied in particular as so-called round cells, as prismatic cells or as so-called pouch cells. The lithium ion cells comprise an electrode assembly having a cathode contact element and an anode contact element. Cylindrical cell wraps (jelly rolls) in particular are known as an electrode assembly for round cells, prismatic flat wraps for prismatic cells and so-called cell stacks. Such an electrode assembly comprises a cathode material, an anode material, a separator and an electrolyte.

Disadvantages in the case of battery units and battery modules known in the prior art are associated in particular with the interconnection of the electrochemical cells, with the size of the battery units and battery modules, above all with the battery units or battery modules that are to be used in hybrid vehicles, plug-in-hybrid vehicles or electric vehicles and are associated with the variability of battery units and battery modules with regard to their being adapted to suit different demands that are placed on a battery unit or a battery module by way of example with respect to the capacity to be provided and/or the performance.

It follows from this that it is an object of the invention to provide a battery unit that is improved with regard to the above mentioned disadvantages and also to provide an improved battery module. In particular, a battery unit is to be provided that comprises a higher energy density, in other words a battery unit that whilst maintaining the same capacity and performance of a conventional battery unit is smaller in size and thus requires less installation space.

SUMMARY OF THE INVENTION

In order to achieve the object, a battery unit is proposed that comprises a plurality of electrically interconnected electrochemical cells that comprise in each case an electrode assembly having a cathode contact element and an anode contact element, and said battery unit comprises an outer sheath that encompasses an arrangement chamber in which the electrochemical cells are arranged, wherein the outer sheath is embodied as a moisture barrier and also as a chemical barrier and the individual electrochemical cells comprise in each case an electrically insulating insulation sheath that encompasses the respective electrode assembly. It is preferred that the electrode assemblies are lithium-based electrode assemblies. The insulation sheaths electrically insulate the electrode assemblies of the electrochemical cells in an advantageous manner with respect to one another. The insulation sheath itself does not in particular assume the function of a moisture barrier and/or a chemical barrier but rather is advantageously used to provide the ionic insulation so that the electrode assemblies cannot be unintentionally short-circuited.

The electrochemical cells are interconnected in an advantageous manner by way of the cathode contact elements and the anode contact elements of the electrode assemblies. In particular it is provided that the battery unit itself comprises contact-making elements that protrude out of the outer sheath so as to make contact with the battery unit.

In the case of the battery unit in accordance with the invention, in particular secondary battery cells, particularly preferred lithium-ion cells are provided as the electrochemical cells, wherein the electrochemical cells having the outer sheath that encompasses said electrochemical cells comprise a common moisture barrier and chemical barrier and each electrochemical cell itself does not comprise in each case such a moisture barrier and/or chemical barrier. As a consequence, the weight of a battery unit in accordance with the invention is advantageously reduced which advantageously contributes to a higher energy density.

In other words, an essential aspect of the present invention is that the electrode assembly itself is not encompassed by a metal-based sheath, wherein the insulation sheath itself does not represent a moisture barrier or a chemical barrier, in other words moisture and/or an electrolyte can diffuse through the insulation sheath. The insulation sheath that encompasses an electrochemical cell is advantageously a synthetic material film, in particular a film of polyethylene (PE) or a polyether ether ketone (PEEK). The moisture barrier and the chemical barrier are provided in the case of the battery unit in accordance with the invention advantageously exclusively by means of the outer sheath. Owing to the fact that not all of the insulation sheaths are metal based, the weight is advantageously reduced. Furthermore, a higher energy density can be advantageously achieved.

In particular, it is provided that the outer sheath of the battery unit comprises a metalized material that provides the moisture barrier and the chemical barrier, in particular in one embodiment a synthetic material film that is metalized from the outside is provided as an outer sheath. Furthermore, the outer sheath is a metal film in accordance with an advantageous embodiment. In particular, it is provided that the outer sheath is formed from two half shells, wherein the half shells are preferably produced in each case from a metal film using a deep-drawing process, it is preferred that one half shell is produced from an aluminum-based metal film and the other half shell is produced from a copper-based or steel-based half shell. It is preferred that the first half shell is used as a first contact-making element of the battery unit and the second half shell is used as a second contact-making element of the battery unit by way of which the battery unit can be advantageously interconnected to other battery units by means of arranging said battery units adjacent to one another.

A further particularly preferred embodiment of the battery unit in accordance with the invention provides that a solvent is introduced into the arrangement chamber that is encompassed by the outer sheath, preferably a conducting salt-free solvent. As a consequence, the electrolyte concentration in the individual electrochemical cells is advantageously maintained at a constant in particular since the electrolyte does not diffuse out of the electrochemical cells without the solvent diffusing into the electrochemical cells. As a consequence, the electrochemical cells are advantageously prevented from drying out. In particular, it is provided that the outer sheath comprises a sealable fill aperture by means of which a solvent can be introduced into the arrangement chamber.

In accordance with a further advantageous embodiment of the battery unit in accordance with the invention, an inert gas is introduced into the arrangement chamber that is encompassed by the outer sheath. The inert gas advantageously provides an explosion protection.

In the case of a further advantageous embodiment of the battery unit in accordance with the invention, the other sheath is moreover embodied as a mechanical barrier. In this case, the outer sheath is preferably embodied as a hard case, in particular as a metal housing. The outer sheath advantageously protects the electrochemical cells from mechanical influences, in particular from becoming deformed and/or being jolted.

A further particularly advantageous embodiment of the battery unit in accordance with the invention provides that the outer sheath comprises at least a first electrically conductive connecting element and at least a second electrically conductive connecting element, wherein at least some of the electrochemical cells are interconnected by way of the connecting elements. In accordance with a particularly advantageous embodiment of the invention, it is provided that a first number of electrochemical cells are electrically interconnected in a parallel manner and a second number of electrochemical cells are electrically interconnected in a parallel manner. The first number of electrochemical cells is advantageously electrically connected in series to the second number of electrochemical cells. In order to connect the electrochemical cells in a parallel manner, it is provided that in each case the cathode contact elements and the anode contact elements of the first number or the second number of electrochemical cells are connected to one another. In order to connect the first number of electrochemical cells in series to the second number of electrochemical cells, it is provided in particular that the interconnected cathode contact elements of the first number of electrochemical cells are connected to the first connecting element and the anode contact elements of the second number of electrochemical cells are connected to the first connecting element. The anode contact elements of the first number of electrochemical cells are advantageously connected to the second connecting element and the cathode contact elements of the second number of electrochemical cells are likewise connected to the second connecting element so that the first number of electrochemical cells is electrically connected in series to the second number of electrochemical cells. This type of interconnection advantageously determines the capacity and/or the performance of the battery unit.

In accordance with a further advantageous embodiment of the battery unit in accordance with the invention, at least one safety barrier is arranged between at least a first number of electrochemical cells and at least a second number of electrochemical cells in the arrangement chamber, wherein the safety barrier is embodied so as to prevent a thermal chain reaction between the first number of electrochemical cells and the second number of electrochemical cells. The safety barrier prevents in particular a thermal reaction in the event of a thermal runaway of one of the electrochemical cells. The safety barrier comprises in an advantageous manner a thermally poor conductive fill material that considerably reduces the amount of heat exchanged between the electrochemical cells. The fill material is preferably embodied as a temperature absorber, preferably by means of so-called phase change materials (pcm).

A further advantageous embodiment of the battery unit in accordance with the invention provides that at least one cooling device is arranged in the arrangement chamber, wherein at least one electrochemical cell is thermally connected to the at least one cooling device. In particular, it is provided that the cooling device is embodied as a cooling plate. The cooling plate comprises in an advantageous manner at least one cooling agent supply duct through which a cooling agent can flow so as to temper the electrochemical cells. In particular, it is provided that in each case a specific number of electrochemical cells is encompassed by two cooling devices so that a uniform tempering of the electrochemical cells is advantageously possible. In accordance with a particularly advantageous embodiment of the invention, the safety barrier is moreover embodied as a cooling device.

A further advantageous embodiment of the invention provides that the electrode assemblies of the electrochemical cells of the battery unit are embodied as a cell wrap (English: jelly roll). In particular, a solid state electrolyte is provided as an electrolyte.

A further advantageous embodiment of the battery unit in accordance with the invention provides that the outer sheath comprises at least one safety valve for reducing an excess pressure within the outer sheath. The safety valve is embodied in an advantageous manner so as to open in the case of a predetermined excess pressure within the outer sheath. The safety valve is thus advantageously embodied so as to prevent the battery unit from exploding, in particular if the internal pressure in the arrangement chamber that is encompassed by the outer sheath increases by way of example as a result of intense warming of an electrochemical cell of the battery unit. In particular, it is provided that the solvent is introduced into the arrangement chamber and where appropriate the inert gas is introduced into the arrangement chamber by way of the safety valve or by way of the aperture that is sealed by the safety valve during the course of producing the battery unit. In particular, it is provided that the safety valve is embodied as a bursting diaphragm or as a check valve.

Furthermore, in order to achieve the object mentioned in the introduction, a battery module having a plurality of electrically interconnected battery units is proposed, wherein the battery units are embodied as battery units in accordance with the invention. In an advantageous manner, such a battery module has a high energy density. Furthermore, as a consequence, an energy storage unit is advantageously much more adaptable. In particular, it is provided that the battery module comprises a battery management system that is embodied in particular so as to control the operation and/or to monitor the operation of the battery units of the battery module.

BRIEF DESCRIPTION OF THE DRAWINGS

Further advantageous details, features and design details of the invention are further explained in conjunction with the exemplary embodiments illustrated in the figures, in which.

DETAILED DESCRIPTION

Figure 1:
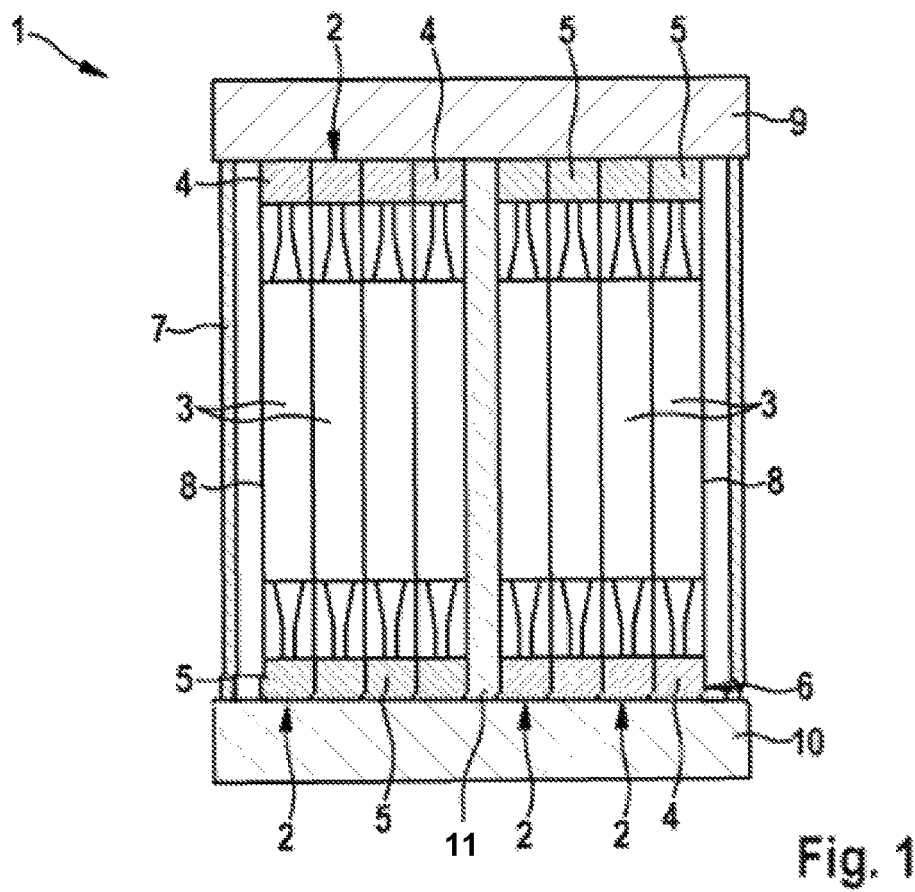
FIG. 1 illustrates a schematic view of an exemplary embodiment for a battery unit in accordance with the invention.

The battery unit 1 illustrated in FIG. 1 comprises a total of eight electrochemical cells 2. The electrochemical cells 2 are rechargeable lithium-ion cells. The electrochemical cells 2 comprise in each case an electrode assembly 3 that is embodied in this case as a cell wrap (jelly roll). Furthermore, the electrode assembly 3 of an electrochemical cell 2 comprises a cathode contact element 4 and an anode contact element 5.

The four electrochemical cells 2 illustrated on the left hand side in FIG. 1 are electrically interconnected in a parallel manner, in that the electrochemical cells 2 are mutually connected to their cathode contact elements 4 and their anode contact elements 5. The same applies for the other four electrochemical cells 2 illustrated on the right hand side in said figure.

Furthermore, an electrochemical cell 2 of the battery unit 1 comprises an electrically insulating insulation sheath 8 that encompasses the electrode assembly 3. The electrode assemblies 3 of the electrochemical cells 2 are electrically insulated with respect to one another by means of the insulation sheaths 8. The insulation sheath 8 is a synthetic material film in the exemplary embodiment. The insulation sheath 8 is not metal-based, in other words the insulation sheath 8 is permeable to moisture and also allows the diffusion of the solvent of the electrolyte of an electrochemical cells 2, said solvent surrounding the insulation sheath 8.

The eight electrochemical cells 2 of the battery unit 1 illustrated in FIG. 1 are encompassed by an outer sheath 7. The outer sheath 7 encompasses an arrangement chamber 8 in which the electrochemical cells 2 are arranged. The outer sheath 8 is embodied as a moisture barrier and as a chemical barrier and thus prevents in particular the penetration of moisture into the arrangement chamber 6 and thus prevents any moisture from penetrating the electrochemical cells 2 and also prevents the solvents from escaping from the arrangement chamber 6. The outer sheath 7 is embodied for this purpose as a synthetic material housing having an applied metallization.

A conducting salt-free solvent (not explicitly illustrated in FIG. 1) is introduced into the arrangement chamber 6 of the battery unit 1. This solvent advantageously prevents the electrochemical cells 2 from drying out. Furthermore, an inert gas (not explicitly illustrated in FIG. 1) is advantageously introduced into the arrangement chamber. The inert gas is advantageously used as an explosion protection.

Moreover, the outer sheath 7 of the battery unit 1 illustrated in FIG. 1 is a first electrically conductive connecting element 9 and a second electrically conductive connection element 10. The electrochemical cells 2 are connected to the first connecting element 9 and the second connecting element 10 by way of the cathode contact elements 4 and the anode contact elements 5 in such a manner that the first four parallel connected electrochemical cells 2 are electrically connected in series to the second four parallel connected electrochemical cells 2. Furthermore, the battery unit 1 can be contacted by way of the first connection element 9 and the second connecting element 10, in particular in such a manner that an electrical consumer device or a charging device can be connected to the battery unit 1. Furthermore, the battery unit 1 can be electrically connected in an advantageous manner by way of the connecting elements 9, 10 to the other battery units, in particular to a battery module. For this purpose, it is provided that the battery units having the corresponding connecting elements are arranged adjacent to one another.

In the exemplary embodiment illustrated in FIG. 1, a safety barrier 11 is arranged between the four first electrically parallel connected electrochemical cells 2 and the second four electrically parallel connected electrochemical cells 2, which in the event of a thermal runaway of one of the electrochemical cells 2 advantageously prevents a thermal chain reaction that would otherwise cause damage to all the electrochemical cells 2 that are arranged in the arrangement chamber 6. Furthermore, the safety barrier 11 is embodied in an advantageous manner as a cooling device. In particular as a cooling device through which a cooling agent can flow. For this purpose, the cooling device advantageously comprises at least one cooling agent supply duct (not explicitly illustrated in FIG. 1).

Figure 2:
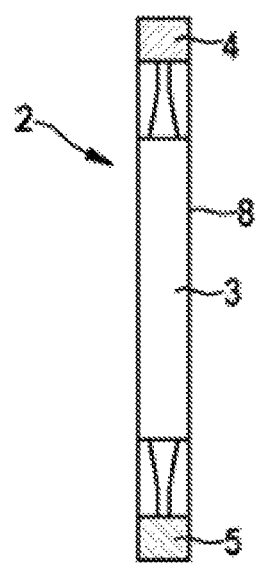
FIG. 2 illustrates a schematic view of an exemplary embodiment for an electrochemical cell of a battery unit in accordance with the invention.

FIG. 2 illustrates an exemplary embodiment for an electrochemical cell 2 for a battery unit in accordance with the invention. The electrochemical cell 2 comprises an electrode assembly 3 having a cathode contact element 4 and an anode contact element 5. The electrode assembly 3 is embodied as a cell wrap (jelly roll) or cell stack or electrode stack having a solid state electrolyte. The electrode assembly 3 is encompassed by an insulation sheath 8 that electrically insulates the electrode assembly 3 with respect to the outside. The insulation sheath 8 thus advantageously represents an ionic insulation. The electrochemical cell 2 is chemically insulated in an advantageous manner first on the plane of the battery unit by means of an outer sheath. This outer sheath encompasses, as explained in conjunction with FIG. 1, a plurality of electrochemical cells that are advantageously interconnected.

The exemplary embodiments illustrated in the figures and explained in conjunction with the figures are used to explain the invention and are not limiting for said invention.

The invention claimed is:

1. A battery unit (1) comprising a plurality of electrically interconnected electrochemical cells (2) that each comprise an electrode assembly (3) having a cathode contact element (4) and an anode contact element (5), and an outer sheath (7) that encompasses an arrangement chamber (6) in which the electrochemical cells (2) are arranged, characterized in that the outer sheath (7) is embodied as a moisture barrier and also as a chemical barrier and the individual electrochemical cells (2) each comprise an electrically insulating insulation sheath (8) that encompasses the respective electrode assembly (3), wherein at least one safety barrier (11) is arranged between at least a first number of electrochemical cells (2) and at least a second number of electrochemical cells (2) in the arrangement chamber (6), wherein the safety barrier (11) is configured to prevent a thermal chain reaction between the first number of electrochemical cells (2) and the second number of electrochemical cells (2), wherein the first number of electrochemical cells (2) is connected in parallel and wherein the second number of electrochemical cells (2) is connected in parallel.

2. The battery unit (1) as claimed in claim 1, characterized in that the outer sheath (7) comprises a metallization that provides the moisture barrier and the chemical barrier.

3. The battery unit (1) as claimed in claim 2, characterized in that a conducting salt-free solvent is introduced into the arrangement chamber (6) that is encompassed by the outer sheath (7).

4. The battery unit (1) as claimed in claim 3, characterized in that an inert gas is introduced into the arrangement chamber (6) that is encompassed by the outer sheath (7).

5. The battery unit (1) as claimed in claim 4, characterized in that the outer sheath (7) is moreover embodied as a mechanical barrier.

6. The battery unit (1) as claimed in claim 5, characterized in that the outer sheath (7) comprises at least a first electrically conductive connecting element (9) and at least a second electrically conductive connecting element (10), wherein at least some of the electrochemical cells are interconnected by way of the connecting elements (9, 10).

7. The battery unit (1) as claimed in claim 6, characterized in that at least one cooling device is arranged in the arrangement chamber (6), wherein at least one electrochemical cell (2) is thermally connected to the at least one cooling device.

8. The battery unit (1) as claimed in claim 7, characterized in that the electrode assemblies (3) are embodied as a cell wrap (jelly roll) or cell stack.

9. The battery unit (1) as claimed in claim 8, characterized in that the outer sheath (7) comprises at least one safety valve for reducing an excess pressure within the outer sheath (7).

10. The battery unit (1) as claimed in claim 1, characterized in that a conducting salt-free solvent is introduced into the arrangement chamber (6) that is encompassed by the outer sheath (7).

11. The battery unit (1) as claimed in claim 1, characterized in that an inert gas is introduced into the arrangement chamber (6) that is encompassed by the outer sheath (7).

12. The battery unit (1) as claimed in claim 1, characterized in that the outer sheath (7) is moreover embodied as a mechanical barrier.

13. The battery unit (1) as claimed in claim 1, characterized in that the outer sheath (7) comprises at least a first electrically conductive connecting element (9) and at least a second electrically conductive connecting element (10), wherein at least some of the electrochemical cells are interconnected by way of the connecting elements (9, 10).

14. The battery unit (1) as claimed in claim 1, characterized in that at least one cooling device is arranged in the arrangement chamber (6), wherein at least one electrochemical cell (2) is thermally connected to the at least one cooling device.

15. The battery unit (1) as claimed in claim 1, characterized in that the electrode assemblies (3) are embodied as a cell wrap (jelly roll) or cell stack.

16. The battery unit (1) as claimed in claim 1, characterized in that the outer sheath (7) comprises at least one safety valve for reducing an excess pressure within the outer sheath (7).

17. A battery module having a plurality of electrically interconnected battery units (1) as claimed in claim 1.

* * * * *